United States Patent
Hong (10) Patent No.: US 7,664,406 B2
(45) Date of Patent: Feb. 16, 2010

(54) OPTICAL LINE TERMINAL IN A WAVELENGTH DIVISION MULTIPLEXING PASSIVE OPTICAL NETWORK

(75) Inventor: Seung Joo Hong, Incheon (KR)

(73) Assignee: LG-Nortel Co., Ltd., Seoul (KR)

( * ) Notice: Subject to any disclaimer, the term of this patent is extended or adjusted under 35 U.S.C. 154(b) by 557 days.

(21) Appl. No.: 11/518,163

(22) Filed: Sep. 11, 2006

(65) Prior Publication Data

US 2007/0065153 A1   Mar. 22, 2007

(30) Foreign Application Priority Data

Sep. 16, 2005   (KR)   .................... 10-2005-0086614

(51) Int. Cl.
*H04B 10/00* (2006.01)
(52) U.S. Cl. .................. 398/167.5; 398/70; 398/165
(58) Field of Classification Search ............. 398/70, 398/71, 100, 138, 139, 164–168
See application file for complete search history.

(56) References Cited

U.S. PATENT DOCUMENTS

| | | | |
|---|---|---|---|
| 6,552,832 B1 * | 4/2003 | Beierle et al. ................ | 398/74 |
| 6,650,841 B1 | 11/2003 | Matsuo et al. | |
| 7,088,724 B2 | 8/2006 | Yamanaka | |
| 7,095,955 B2 | 8/2006 | Bernard et al. | |
| 2003/0147654 A1 * | 8/2003 | Sung et al. ................... | 398/168 |
| 2007/0109974 A1 * | 5/2007 | Cutillo et al. ................ | 370/254 |
| 2007/0297800 A1 * | 12/2007 | Choi et al. .................... | 398/71 |

OTHER PUBLICATIONS

European Search Report dated Nov. 30, 2006.

* cited by examiner

*Primary Examiner*—Dzung D Tran
(74) *Attorney, Agent, or Firm*—KED & Associates, LLP

(57) ABSTRACT

An OLT in a WDM-PON may include a main board and a sub board. The main board may include a master optical transmitting/receiving control/supervising section and the sub board may include a plurality of optical transceivers and a slave optical transmitting/receiving control/supervising section. The master optical transmitting/receiving control/supervising section may produce a data input signal and a data read-control signal for controlling the plurality of optical transceivers of the sub board. The slave optical transmitting/receiving control/supervising section may receive the data input signal and the data read-control signal, and read the data input signal in accordance with the read-control signal. The optical transceivers may be controlled based on the data input signal.

23 Claims, 6 Drawing Sheets

OPTICAL LINE TERMINAL IN A WAVELENGTH DIVISION MULTIPLEXING PASSIVE OPTICAL NETWORK

The present application claims priority from Korean Patent Application No. 10-2005-0086614, filed Sep. 16, 2005 and entitled "Optical Line Terminal of a Wavelength Division Multiplexing-Passive Optical Network," the subject matter of which is incorporated herein by reference.

BACKGROUND

1. Field

Embodiments of the present invention may relate to an Optical Line Terminal (OLT). More particularly, embodiments of the present invention may relate to an OLT in a wavelength division multiplexing-passive optical network (WDM-PON).

2. Background

WDM-PON is a configuration method for Fiber to the Home (FTTH). WDM-PON may provide a sufficient service bandwidth required for a particular subscriber by allotting a different portion of an entire wavelength for each of the subscribers.

BRIEF DESCRIPTION OF THE DRAWINGS

Features in accordance with embodiments of the present invention will become apparent from the following detailed description taken in conjunction with the accompanying drawings in which like reference numerals refer to like elements and wherein.

DETAILED DESCRIPTION

Figure 1:
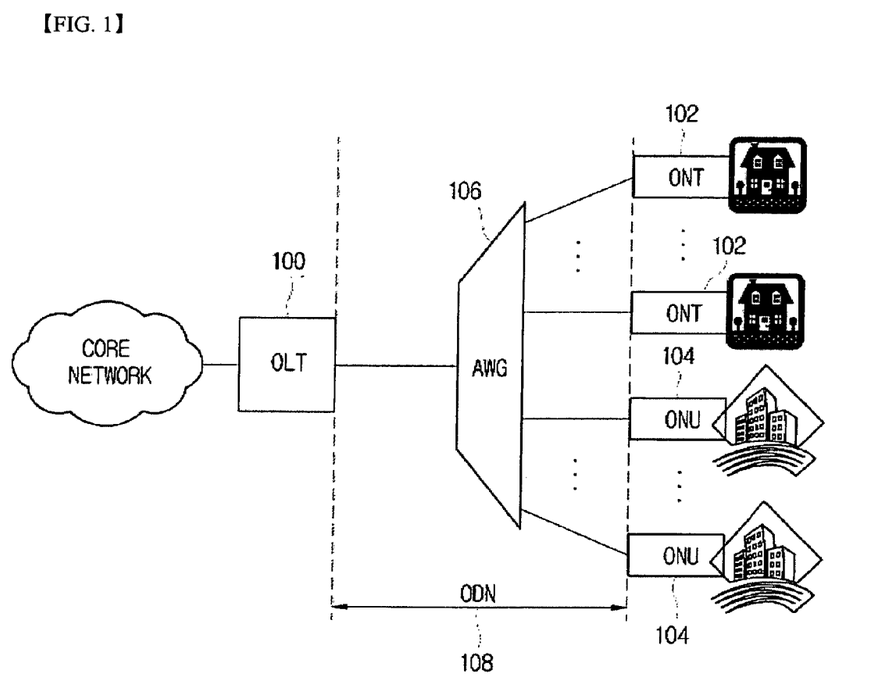
FIG. 1 is a schematic diagram showing a structure in a WDM-PON.

FIG. 1 is a schematic drawing showing a structure of a WDM-PON according to an example arrangement. Other arrangements are also possible. The WDM-PON may include an optical line terminal (OLT) 100 located at a central base station, an optical network terminal (ONT) 102 and an optical network unit (ONU) 104 located at a subscribers' side, and an optical distribution network (ODN) 108 that includes an optical fiber cable and an arrayed waveguide grating (AWG) 106 for multiplexing and de-multiplexing wavelengths.

The OLT 100 may process signals received from the ONT 102 and the ONU 104 located at the subscribers' side so that the access network can be interlocked with a core network. The OLT 100 may also transmit signals received from the core network to the ONT 102 and the ONU 104 so that a subscriber can obtain a desired service.

Figure 2:
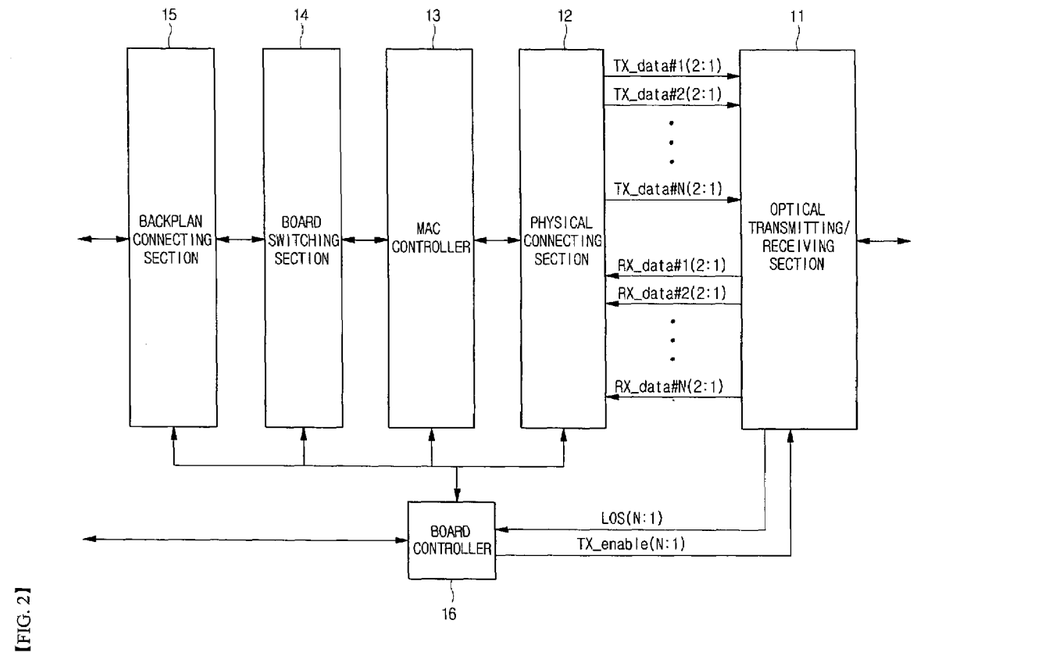
FIG. 2 is a schematic diagram showing a structure of an OLT.

FIG. 2 is a schematic diagram showing a structure of the OLT 100 located at a central base station in the WDM-PON. As shown in FIG. 2, the OLT 100 may include an optical transmitting/receiving section 11, a physical connecting section 12, a MAC controller 13, a board switching section 14, a backplan connecting section 15, and a board controller 16.

The physical connecting section 12 may extract a clock from a data signal inputted from the optical transmitting/receiving section 11 to arrange a frame. The physical connecting section 12 may also output the arranged frame to the optical transmitting/receiving section 11 in synchronization with a corresponding clock.

The MAC controller 13 may manage a logical connection with the ONT 102 terminal apparatus or the ONU 104 terminal apparatus for each subscriber.

The board switching section 14 may support data transmission among subscribers within a same OLT. The board switching section 14 may also insert/extract Operation and Management (OAM) between the OLT 100 and the ONT 102 or the ONU 104 while being interlocked with the board controller 16.

The backplan connecting section 15 may transmit and receive high speed data that is concentrated through a motherboard of a system having a board switching section and a plurality of OLTs. Data signals that are transmitted through the backplan connecting section 15 may be transmitted via the backplan of the system.

The board controller 16 may control every function block within the OLT 100 and manage to generate/collect OAM between the OLT 100 and the ONT 102 or the ONU 104 by being interlocked with the board switching section 14. The board controller 16 may transmit and receive a control signal or OAM via the backplan of the system while being interlocked with a central controller such that the central controller manages the total system without a hitch.

If the OLT 100 is constructed as a unit having a 19 or 23 inch width and height, for example, while the optical transmitting/receiving section 11 is constructed as a sub board, then other remaining elements (i.e., the physical connecting section 12, the MAC controller 13, the board switching section 14, the backplan connecting section 15 and the board controller 16) may be constructed as a main board. A connector may then be needed to match the main board with the sub board.

When the optical transmitting/receiving section 11 includes N optical transceivers corresponding to N subscribers, transmission data signals TX_data#1[2:1]-TX_data#N[2:1] may be transmitted from the physical connecting section 12 to the optical transmitting/receiving section 11 in order to match the main board with the sub board. In addition, optical transmission control signals TX_enable#1-TX_enable#N may be transmitted from the board controller 16 to the optical transmitting/receiving section 11. Also, received data signals RX_data#1[2:1]-RX_data#N[2:1] may be transmitted from the optical transmitting/receiving section 11 to the physical connecting section 12 while optical loss alarm signals LOS#1-LOS#N may be transmitted from the optical transmitting/receiving section 11 to the board controller 16.

When the optical transmitting/receiving section 11 includes N optical transceivers 111-1 to 111-N for N subscribers, a total of 6N matching signals for N subscribers may be connected via a connector for matching the main board with the sub board. The 6N matching signals may include 2N transmission data signals, 2N receiving data signals, N optical transmission control signals and N optical loss alarm signals. For example, if 32 subscribers exist, then 192 signals (i.e., 6*32) may be used. Further, if 64 subscribers exist, then 394 signals (i.e., 6*64) may be used.

Since signals (i.e., 6 times the amount of subscribers) are required for matching the main board with the sub board, the connector may be equipped with multiple pins. This may limit the space of the main board and the sub board.

Further, while a pair of differential signals such as positive emitter coupled logic (PECL) signals may be used as a transmission data signal, a single differential signal such as a PECL or TTL/CMOS signal may be used as an optical loss alarm signal, and a single differential signal such as TTL/CMOS signal may be used as an optical transmission control signal. Due to the space between the main board and the sub board, the optical loss alarm signals and the optical transmission control signals may acquire long signal patterns. Thus, interference among adjacent signal patterns may occur, which may result in data error or abnormal operation of chips located in other areas of a board.

Further, as signal patterns become longer, a larger amount of electromagnetic waves may be produced. Also, data error or abnormal operation of chips located in other areas of the board may also occur based on outside electromagnetic waves. This may significantly lower the credibility of the system.

Figure 3:
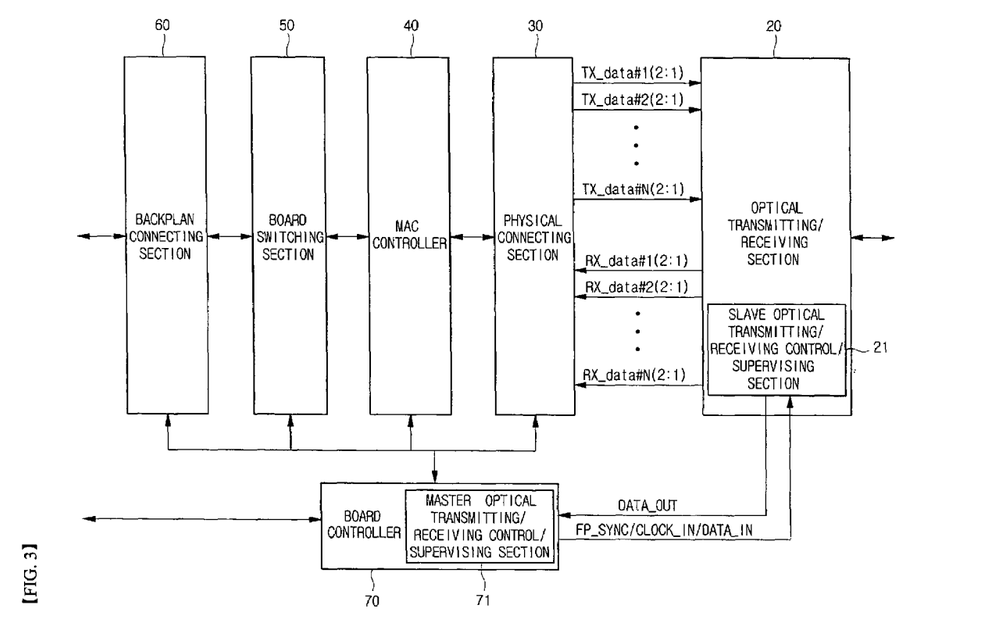
FIG. 3 is a schematic diagram showing a structure of an OLT according to an example embodiment of the present invention.

FIG. 3 is a schematic diagram showing a structure of an OLT according to an example embodiment of the present invention. Other embodiments and configurations are also within the scope of the present invention.

FIG. 3 shows that the OLT 100 includes an optical transmitting/receiving section 20, a physical connecting section 30, a MAC controller 40, a board switching section 50, a backplan connecting section 60 and a board controller 70. The physical connecting section 30, the MAC controller 40, the board switching section 50, the backplan connecting section 60 and the board controller 70 may be formed on a main board (or first board), and the optical transmitting/receiving section 20 may be formed on a sub board (or second board).

The physical connecting section 30 may extract a clock from data signals inputted from the optical transmitting/receiving section 20 to arrange a frame. The physical connection section 30 may also output an arranged frame to the optical transmitting/receiving section 20 in synchronization with a corresponding clock.

The MAC controller 40 may mange a logical connection with the ONT 102 terminal apparatus or the ONU 104 terminal apparatus for each subscriber.

The board switching section 50 may support a data transmission among subscribers within a same OLT, or insert/extract Operation and Management (OAM) between the OLT 100 and the ONT 102 or the ONU 104 while being interlocked with the board controller 60.

The backplan connecting section 60 may transmit and receive high speed data that is concentrated through a mother board of a system having a board switching section and a plurality of OLTs. Data signals that are transmitted via the backplan connecting section 60 may be transmitted through the backplan of the system.

The board controller 70 may control function blocks within the OLT 100 and generate/collect OAM between the OLT 100 and the ONT 102 or the ONU 104 while being interlocked with the board switching section 50. The board controller 70 may transmit and receive a control signal or OAM through the backplan of the system while being interlocked with the central controller such that the central controller may manage the total system.

According to an example embodiment of the present invention, the OLT in the WDM-PON may include a slave optical transmitting/receiving control/supervising section 21 in the optical transmitting/receiving section 20 (of the sub board) and may also include a master optical transmitting/receiving control/supervising section 71 in the board controller 70 (of the main board). A frame sync signal FP_SYNC, a clock signal CLOCK_IN, a data input signal DATA_IN and a data output signal DATA_OUT may be used for mutually interfacing the slave optical transmitting/receiving control/supervising section 21 with the master optical transmitting/receiving control/supervising section 71.

The OLT 100 may use a data input signal DATA_IN, a data output signal DATA_OUT, a frame sync signal FP_SYNC, and a clock signal CLOCK_IN so that the signal interchange is performed between the optical transmitting/receiving section 20 and the board controller 70. When N subscribers exist, the number of required signals may be reduced from 2N to 4. Accordingly, as the number of connector pins used for matching the boards is reduced, spaces of the main board and the sub board may be effectively used. Also, as the number of signal patterns is reduced from 2N to 4, signal interference and electromagnetic interference from a gap among adjacent signal patterns may be prevented and/or reduced. In addition, since outside electromagnetic waves have less effect upon the system, the system's credibility at a board level may be established.

Figure 4:
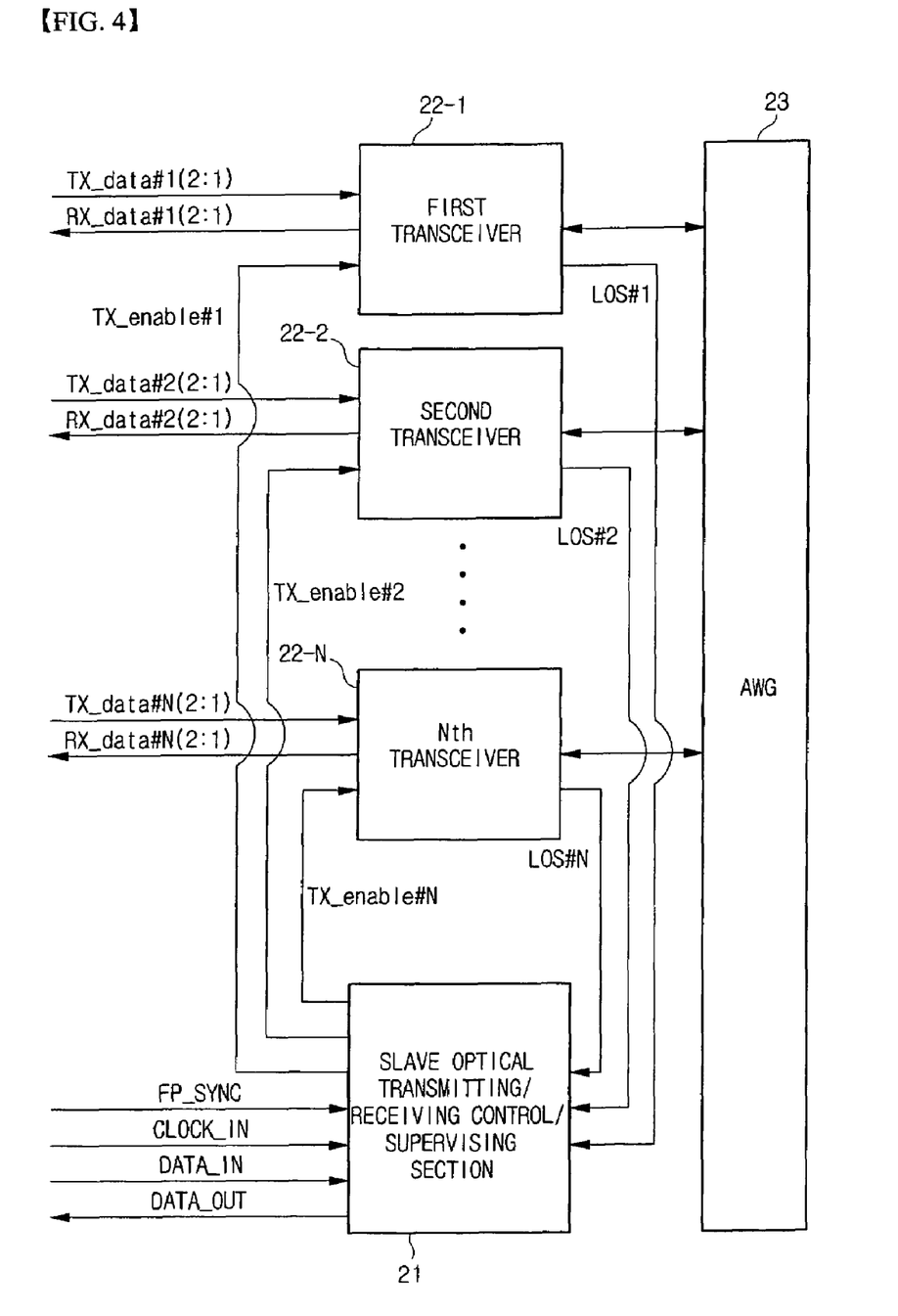
FIG. 4 is a schematic diagram showing an optical transmitting/receiving section.

FIG. 4 is a schematic diagram showing the optical transmitting/receiving section 20 shown in FIG. 3. When the WDM-PON is configured with a wavelength selectivity light source, the optical transmitting/receiving section 20 may include the slave optical transmitting/receiving control/supervising section 21, N optical transceivers for N subscribers 22-1 to 22-N, and an AWG 23. The optical transceivers shown in FIG. 4 may be suitable for a wavelength selectivity light source such as a distributed feedback laser diode (DFB-LD) for using Dense Wavelength Division Multiplexing (WDM). One skilled in the art would understand that when the WDM-PON is configured with a wavelength non-selectivity light source, the optical transceiver may further include a light source supplier/a light source input and a passive element section other than the optical transceivers 22-1 to 22-N and the AWG 23. For ease of illustration, examples will be described with respect to a wavelength selectivity light source.

The slave optical transmitting/receiving control/supervising section 21 may receive an optical loss alarm signal from each optical transceiver 22-1 to 22-N. In addition, the slave optical transmitting/receiving control/supervising section 21 may mutually match the board controller 70 of the main board through the frame sync signal FP_SYNC, the clock signal CLOCK_IN, the data input signal DATA_IN and the data output signal DATA_OUT. The slave optical transmitting/receiving control/supervising section 21 may be configured as a logic device such as a Complex Programmable Logic Device (CPLD) to process the optical loss alarm signals and the optical transmission control signals.

Figure 5:
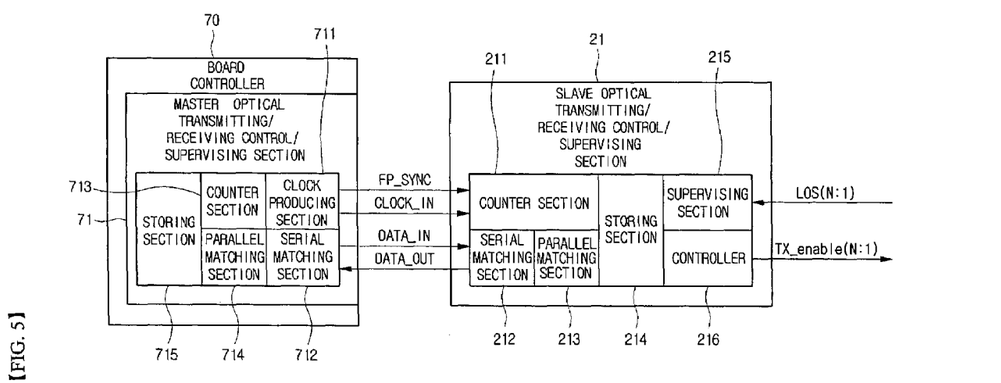
FIG. 5 is a schematic diagram showing a slave optical transmitting/receiving control/supervising section and a master optical transmitting/receiving control/supervising section.

FIG. 5 is a schematic diagram showing a slave optical transmitting/receiving control/supervising section and a master optical transmitting/receiving control/supervising section. As shown in FIG. 5, the master optical transmitting/receiving control/supervising section 71 may include a clock producing section 711, a serial matching section 712, a counter section 713, a parallel matching section 714 and a storing section 715. The slave optical transmitting/receiving control/supervising section 21 may include a counter section 211, a serial matching section 212, a parallel matching section 213, a storing section 214, a supervising section 215 and a controller 216.

The master optical transmitting/receiving control/supervising section 71 may transmit the frame sync signal FP_SYNC, the clock signal CLOCK_IN and the data input signal DATA_IN to the slave optical transmitting/receiving control/supervising section 21. The master optical transmitting/receiving control/supervising section 71 may receive the data output signal DATA_OUT from the slave optical transmitting/receiving control/supervising section 21.

Figure 6:
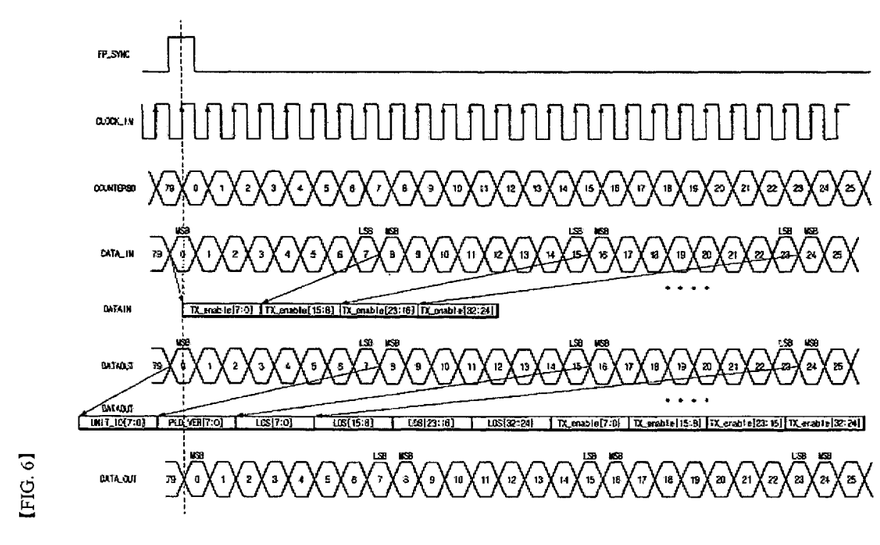
FIG. 6 shows a timing graph for matching signals used in a slave optical transmitting/receiving control/supervising section and a master optical transmitting/receiving control/supervising section shown in FIG. 5.

The clock producing section 711 may produce the clock signal CLOCK_IN and transmit the produced clock signal to the slave optical transmitting/receiving control/supervising section 21. The counter section 713 may counter '0' at a rising edge of the clock signal CLOCK_IN as shown in FIG. 6 in accordance with the clock signal CLOCK_IN transmitted from the clock producing section 711. The counter section 713 may provide a count value to the clock producing section 711 and the serial matching section 712. The clock producing section 711 may produce the frame sync signal FP_SYNC when the counter section 713 counts '0' and may transmit the produced frame sync signal FP_SYNC to the slave optical transmitting/receiving control/supervising section 21.

The master optical transmitting/receiving control/supervising section 71 may produce the optical transmission control signals corresponding to N optical transceivers of the optical transmitting/receiving section 20. The master optical transmitting/receiving control/supervisions section 71 may then store the optical transmission control signals in the storing section 715. The storing section 715 may include a separate area to store the optical transmission control signals TX_enable. The storing section 715 may also include a separate area for storing a unit ID register UNIT_ID to recognize a type of the sub board, a version information register PLD_VER to manage a history of program logic, and optical loss alarm signals LOS to alarm an optical loss of the optical transceivers 22-1 to 22-N for each subscriber.

The parallel matching section 714 may read the optical transmission control signals TX_enable stored in the storing section 715 and convert the read data to the serial data. The parallel matching section 714 may provide the serial data to the serial matching section 712 in accordance with the clock signal CLOCK_IN received from the clock producing section 711. The serial matching section 712 may arrange the serial data received from the serial matching section 712 so that a first bit of the serial data is outputted when the frame sync signal FP_SYNC is high. The arranged serial data may be transmitted to the slave optical transmitting/receiving control/supervising section 21 as the data input signal DATA_IN. A most significant bit (MSB) in a byte unit may be transmitted first and a least significant bit (LSB) may be transmitted later.

A total of 80 bits of the data input signal DATA_IN may be transmitted during one period according to an example embodiment. As one example embodiment, 32 bits for controlling the optical transmission may be sequentially transmitted in accordance with the frame sync signal FP_SYNC produced in the clock producing section 711. In this case, the signal '0' may be transferred during the remaining 48 bits.

The master optical transmitting/receiving control/supervising section 71 may receive the data output signal DATA_OUT from the slave optical transmitting/receiving control/supervising section 21. The serial matching section 712 may arrange the data output signal DATA_OUT that is inputted from the slave optical transmitting/receiving control/supervising section 21 based on the clock signal CLOCK_IN produced in the clock producing section 711 and the count value provided from the counter section 713. The serial matching section 712 may then provide the arranged data output signal DATA_OUT to the parallel matching section 714.

The parallel matching section 714 may convert the received data output signal DATA_OUT to the parallel signal and store the parallel signal in the storing section 715. The storing section 715 may store the data except N optical transmission control signals that are already stored. The parallel matching section 714 may perform an examination function to compare the optical transmission control signals TX_enable[N:1] outputted to the slave optical transmitting/receiving control/supervising section 21 with the optical transmission control signals TX_enable[N:1] inputted from the slave optical transmitting/receiving control/supervising section 21. A determination may then be made whether an error has occurred in the data transmission between the main board and the sub board. If an error of more than one bit has occurred a predetermined number of times, then the parallel matching section 714 may alarm an error of matching between the main board and the sub board via the board controller 70.

The slave optical transmitting/receiving control/supervising section 21 that mutually matches the master optical transmitting/receiving control/supervising section 71 may receive the clock signal CLOCK_IN, the frame sync signal FP_SYNC and the data input signal DATA_IN. At a same time (or substantially same time), the slave optical transmitting/receiving control/supervising section 21 may transmit the data output signal DATA_OUT to the master optical transmitting/receiving control/supervising section 71.

The counting section 211 may receive the clock signal CLOCK_IN and the frame sync signal FP_SYNC from the master optical transmitting/receiving control/supervising section 71. The counting section 211 may then perform a counting operation in accordance with the clock signal CLOCK_IN and the frame sync signal FP_SYNC. The counting section 211 may provide a count value to the serial matching section 212. The serial matching section 212 may arrange the data input signal DATA_IN inputted from the master transmitting/receiving control/supervising section 71 based on the clock signal CLOCK_IN inputted from the master transmitting/receiving control/supervising section 71 and based on the count value provided from the counting section 211. The arranged data input signal is shown as DATAIN in FIG. 6. The DATAIN signal may include the optical transmission control signals for each optical transceiver of each subscriber in order. The serial matching section 212 may provide the arranged data input signal DATAIN to the parallel matching section 213 in order. The parallel matching section 213 may arrange the data input signal DATAIN provided from the serial matching section 212 and store the data input signal DATAIN in the storing section 214.

The controller 216 may produce the optical transmission control signals TX_enable[N:1] based on the parallel data stored in the storing section 214 and provide the produced control signal to each optical transceiver 22-1 to 22-N. Thus, the optical transmission status of each optical transceiver 22-1 to 22-N may be controlled.

Similar to the storing section 715, the storing section 214 may include a separate area for storing the optical transmission control signal TX_enable included in the data input signal DATAIN. The storing section 214 may also include a separate area for storing the unit ID register UNIT_ID to recognize the type of sub board, the version information register PLD_VER to manage the history of the program logic, and the optical loss alarm signals LOS to alarm the optical loss of the optical transceivers 22-1 to 22-N for each subscriber.

The supervising section 215 may receive the optical loss alarm signals LOS#1-LOS#N from the optical transceiver 22-1 to 22-N and store the optical loss alarm signals LOS#1-LOS#N in the storing section 214. The storing section 214 may store N optical loss alarm signals for N transceivers 22-1 to 22-N. The parallel matching section 213 may read the data stored in the storing section 214 and convert the parallel data to serial data. The parallel matching section 213 may provide the converted serial data to the serial matching section 212 in accordance with the clock signal CLOCK_IN provided from the master transmitting/receiving control/supervising section 71. The serial data provided to the serial matching section 212 is shown as DATAOUT in FIG. 6. The DATAOUT may include an 8 bit unit ID register UNIT_ID[7:0], an 8 bit version information register PLD_VER[7:0], a 32 bit optical loss alarm signal LOS[31:0] and a 32 bit optical control signal TX_enable[31:0] corresponding to 32 subscribers.

The serial matching section 212 may arrange the data output signal DATAOUT so that when the frame sync signal FP_SYNC is high, the most significant bit (MSB) of the unit ID register UNIT_ID is outputted. The arranged data output signal DATA_OUT may be transmitted to the master optical transmitting/receiving control/supervising section 71. As shown in FIG. 6, the DATA_OUT has a timing margin compared to DATAOUT. The serial matching section 212 may arrange the internal output data DATAOUT with a standard of a rising edge of the clock producing section that enables the master optical transmitting/receiving control/supervising section 71 to extract the data with timing margin.

Embodiments of the present invention may provide an OLT for decreasing a number of signals between a main board and a sub board as well as a number of connector pins used for matching the main board and the sub board. Embodiments of the present invention may prevent or reduce signal interference and electromagnetic interference that may otherwise result from a gap among adjacent signal patterns in the WDM-PON.

An OLT in a WDM-PON may include a main board and a sub board. The main board may include a master optical transmitting/receiving control/supervising section. The sub board may include a plurality of optical transceivers and a slave optical transmitting/receiving control/supervising section. The master optical transmitting/receiving control/supervising section may produce a data input signal and a read-control signal for controlling the plurality of optical transceivers in the sub board. The slave optical transmitting/receiving control/supervising section may receive the data input signal and the read-control signal and read the data input signal in accordance with the read-control signal. The optical transceivers may be controlled in accordance with the data input signal.

Embodiments of the present invention have been described with respect to a signal and/or signals. One skilled in the art would understand that these terminologies may be interchangeable between the singular and the plural.

Any reference in this specification to "one embodiment," "an embodiment," "example embodiment," etc., means that a particular feature, structure, or characteristic described in connection with the embodiment is included in at least one embodiment of the present invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. An optical line terminal in a wavelength division multiplexing passive optical network, the optical terminal line comprising:

a main board having a master optical transmitting/receiving control/supervising section; and a sub board having a plurality of optical transceivers and a slave optical transmitting/receiving control/supervising section, wherein the master optical transmitting/receiving control/supervising section produces a data input signal and a data read-control signal to control the plurality of optical transceivers of the sub board, and wherein the slave optical transmitting/receiving control/supervising section receives the data input signal and the read-control signal and processes the data input signal based on the read-control signal, and wherein the optical transceivers are controlled based on the data input signal, wherein the master optical transmitting/receiving control/supervising section comprises:

a clock producing section to produce the read-control signal and to transmit the read-control signal to the slave optical transmitting/receiving control/supervising section;

a controlling section to provide optical transmission control signals to control the plurality of optical transceivers;

a parallel matching section to convert the optical transmission control signals to serial data; and a serial matching section to arrange the serial data received from the parallel matching section, to produce the data input signal and to transmit the data input signal to the slave optical transmitting/receiving control/supervising section.

2. The optical line terminal of claim 1, wherein:

the slave optical transmitting/receiving control/supervising section receives an optical transmission alarm signal from each of the optical transceivers and produces a data output signal; and the master optical transmitting/receiving control/supervising section receives the data output signal and processes the data output signal based on the read-control signal.

3. The optical line terminal of claim 2, wherein the serial matching section receives the data output signal from the slave optical transmitting/receiving control/supervising section and transmits the data output signal to the parallel matching section, and the parallel matching section compares the optical transmission control signals included in the data input signal and the optical transmission control signals included in the data output signal.

4. The optical line terminal of claim 2, wherein the slave optical transmitting/receiving control/supervising section comprises:

a supervising section to receive the optical transmission alarm signals from each of the optical transceivers;

a storing section to store the optical transmission alarm signals;

a parallel matching section to read the optical transmission alarm signals and to convert the optical transmission alarm signals to serial data; and a serial matching section to receive the serial data from the parallel matching section, to produce a data output signal and to transmit the data output signal to the master optical transmitting/receiving control/supervising section.

5. The optical line terminal of claim 4, wherein the storing section includes separate areas to store the optical transmission control signals, the optical loss alarm signals, a unit ID register to recognize a type of the sub board and a version information register to manage an internal history of program logic.

6. The optical line terminal of claim 2, wherein the data output signal includes information regarding a unit ID register, a version information register, optical loss alarm signals and optical transmission control signals in order.

7. The optical line terminal of claim 2, wherein the data input signal includes optical transmission control signals having a frame structure to control each of the optical transceivers.

8. The optical line terminal of claim 1, wherein the serial matching section receives a data output signal from the slave optical transmitting/receiving control/supervising section and transmits the data output signal to the parallel matching section, and the parallel matching section compares the optical transmission control signals included in the data input signal and the optical transmission control signals included in the data output signal.

9. The optical line terminal of claim 1, wherein the slave optical transmitting/receiving control/supervising section comprises:

a supervising section to receive an optical transmission alarm signal from each of the optical transceivers;

a storing section to store the optical transmission alarm signals;

a parallel matching section to read the optical transmission alarm signals and to convert the optical transmission alarm signals to serial data; and a serial matching section to receive the serial data from the parallel matching section, to produce a data output signal and to transmit the data output signal to the master optical transmitting/receiving control/supervising section.

10. The optical line terminal of claim 9, wherein the storing section includes separate areas to store the optical transmission control signals, the optical loss alarm signals, a unit ID register to recognize a type of the sub board and a version information register to manage history of program logic.

11. The optical line terminal of claim 9, wherein the data output signal includes a unit ID register, a version information register, optical loss alarm signals and optical transmission control signals in order.

12. The optical line terminal of claim 1, wherein the data input signal includes optical transmission control signals having a frame structure to control each optical transceiver.

13. An optical line terminal in a wavelength division multiplexing passive optical network, comprising:

a first board that includes a first control section; and a second board that includes a plurality of optical transceivers and a second control section, the first control section to produce a data input signal and a data control signal to control the plurality of optical transceivers, and the second control section to receive the data input signal and the control signal from the first board and to process the data input signal based on the control signal, and the optical transceivers are controlled based on the data input signal, wherein the first control section comprises:

a clock producing section to produce the control signal and to transmit the control signal to the second control section;

a controlling section to provide at least one optical transmission control signal to control at least one of the plurality of optical transceivers;

a parallel matching section to convert the at least one optical transmission control signal to serial data; and a serial matching section to arrange the serial data and produce the data input signal, and the serial matching section to transmit the data input signal to the second control section.

14. The optical line terminal of claim 13, wherein:

the second control section receives an optical transmission alarm signal from at least one optical transceiver and produces a data output signal; and the first control section receives the data output signal and processes the data output signal based on the control signal.

15. The optical line terminal of claim 14, wherein the second control section comprises:

a supervising section to receive at least one optical transmission alarm signal;

a storing section to store the optical transmission alarm signal;

a parallel matching section to convert the optical transmission alarm signal to serial data; and a serial matching section to receive the serial data from the parallel matching section and produce a data output signal, and the serial matching section to transmit the data output signal to the first control section.

16. The optical line terminal of claim 15, wherein the data output signal includes information regarding: a unit ID register, a version information register, an optical loss alarm signal and optical transmission control signals in order.

17. The optical line terminal of claim 15, wherein the data input signal includes an optical transmission control signal having a frame structure to control each optical transceiver.

18. The optical line terminal of claim 15, wherein the storing section includes areas to store at least one optical transmission control signal, at least one optical loss alarm signal, a unit ID register and a version information register.

19. The optical line terminal of claim 13, wherein the serial matching section to receive the data output signal from the second control section and to provide the data output signal to the parallel matching section, and the parallel matching section to compare at least one optical transmission control signal included in the data input signal and at least one optical transmission control signal included in the data output signal.

20. An optical line terminal comprising:

a first optical transmitting/receiving control section;

a second optical transmitting/receiving control section;

a plurality of optical transceivers; and a connector between the first optical transmitting/receiving control section and the second optical transmitting/receiving control section, the first optical transmitting/receiving control section to produce a data input signal and a data read-control signal to control the plurality of optical transceivers, and the second optical transmitting/receiving control section to receive the data input signal and the read-control signal and to process the data input signal based on the read-control signal, and the optical transceivers are controlled based on the data input signal, wherein the second optical transmitting/receiving control section comprises:
- a supervising section to receive at least one optical transmission alarm signal;
- a storing section to store the optical transmission alarm signal;
- a parallel matching section to convert the optical transmission alarm signal to serial data; and
- a serial matching section to receive the serial data from the parallel matching section and produce a data output signal, and the serial matching section to transmit the data output signal to the first optical transmitting/receiving control section.

21. The optical line terminal of claim 20, wherein:
the second optical transmitting/receiving control section receives an optical transmission alarm signal from at least one optical transceiver and produces a data output signal; and
the first optical transmitting/receiving control section receives the data output signal and processes the data output signal based on the read-control signal.

22. The optical line terminal of claim 20, wherein the first optical transmitting/receiving control section comprises:
- a clock producing section to produce the read-control signal and to transmit the read-control signal to the second optical transmitting/receiving control section;
- a controlling section to provide at least one optical transmission control signal to control the plurality of optical transceivers;
- a parallel matching section to convert the optical transmission control signal to serial data; and
- a serial matching section to arrange the serial data and produce the data input signal, and the serial matching section to transmit the data input signal to the second optical transmitting/receiving control section.

23. The optical line terminal of claim 22, wherein the serial matching section to receive a data output signal from the second optical transmitting/receiving control section and to transmit the data output signal to the parallel matching section, and the parallel matching section to compare the optical transmission control signal included in the data input signal and the optical transmission control signal included in the data output signal.

* * * * *